Figure 1:
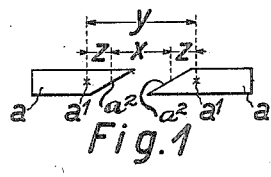
Figure 1A:
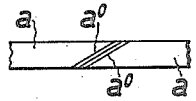

Nov. 15, 1927.

O. EPPENSTEIN 1,649,106

DEVICE FOR TESTING BOLT THREADS

Filed May 22, 1923

Inventor:
Otto Eppenstein

Patented Nov. 15, 1927.

1,649,106

UNITED STATES PATENT OFFICE.

OTTO EPPENSTEIN, OF JENA, GERMANY, ASSIGNOR TO THE FIRM OF CARL ZEISS, OF JENA, GERMANY.

DEVICE FOR TESTING BOLT THREADS.

Application filed May 22, 1923, Serial No. 640,744, and in Germany May 31, 1922.

The present invention relates to a device for testing bolt threads, e. g. with regard to the flank diameter and the flank angle, which is to be operated in the following manner. Two bodies, each of which is provided with a knife-edge forming part of the apparatus are laid against two flanks of the thread to be tested. Then the cross-wires of a microscope are brought into coincidence with the light gap existing between the one knife-edge and the corresponding flank. Thereupon the microscope and the thread are displaced relatively to each other until the light gap existing between the other knife-edge and the corresponding flank are in coincidence (vide Patent No. 1,461,782).

According to the present invention each of the said bodies is provided with a mark on the side facing the microscope and, when measuring, the microscope is no longer displaced from one light gap to the other but from one mark to the other. One thus attains the advantage that it is no longer necessary to sharply focus the microscope on the plane of the light gap but only upon the marks; consequently the source of errors disappears which consists in this that in the first case an error of measurement is caused by an inaccuracy of sharply focussing. By using the bodies, each of which is provided with a knife-edge according to the invention the amount of displacement of the microscope from one mark to the other is naturally no longer the measure sought. On the contrary, the latter has to be computed from this displacement and the distances of the marks from the knife-edges to be laid against the thread flanks. The marks may be constructed in different ways. For instance, the marks may be formed by lines which are parallel to the knife-edges laid against the thread flanks. In that case the marks may be both transparent and observed by transmitted light, and opaque and observed by incident light.

Moreover, according to the invention the special computation of the measure sought from the displacement of the microscope can be avoided by a special construction of the marks and the microscope. By constructing the marks disposed on the said bodies in such a way that they each consist of a linear mark each parallel to the knife-edge and by so constructing the microscope, that in such a position of the said bodies in which their knife-edges come in contact with each other, it is possible to bring the images, produced by the microscope objective, of the linear marks fixed on the said bodies into coincidence simultaneously with a linear mark disposed in the image plane of the microscope, the measure to be ascertained is directly equal to the displacement of the microscope. That such is the case with a flank angle of any size may be readily seen from the fact that with the above mentioned construction to a flank diameter zero there would correspond a displacement zero of the microscope because in that case the prescribed coincidence of the two marks of the said bodies with the two marks of the microscope already takes place without a displacement. Hence, to a value, different from zero, of the flank diameter there corresponds a displacement of the magnitude of this diameter in order to pass over from the coincidence of the one mark of the said bodies to the coincidence of the other mark of the bodies.

In order to avoid the confusions which might arise by disposing in the microscope two marks, each of which always appertains to a certain, definite one of both marks of the said bodies, it is possible to construct the microscope as a double-image microscope, viz, in such a way that the ray pencils emanating from the two marks of the bodies are so divided at any place of the microscope by reflecting or refractive means, that in the image field of the microscope two images of each mark of the bodies are produced. In that case the arrangement can be made in such a way, that in such a position of the knife-edges in which they come in contact with each other, the one image of the one mark of the bodies coincides with an image of the other mark of the bodies. The two other images are not rendered visible to the observer. Besides, in the microscope there is only required a single mark which, when measuring the flank diameter, is first to be brought into coincidence with the image, visible to the observer, of the one mark of the said bodies and after the displacement of the microscope with the visible image of the other mark of the said bodies.

Figure 2:
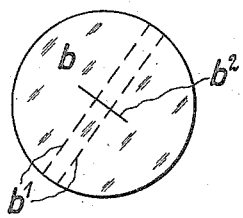
Figure 5:
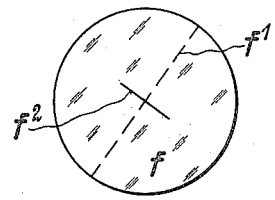
Figure 3:
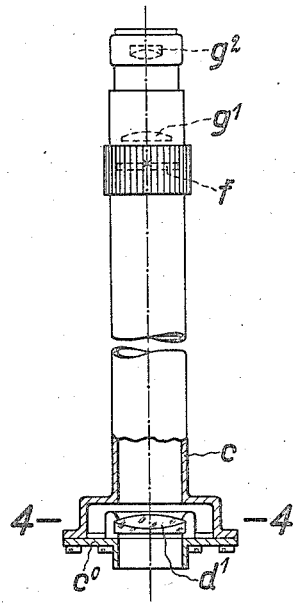
Figure 4:
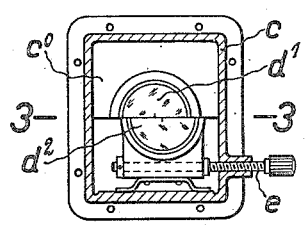
Figures 6, 8:
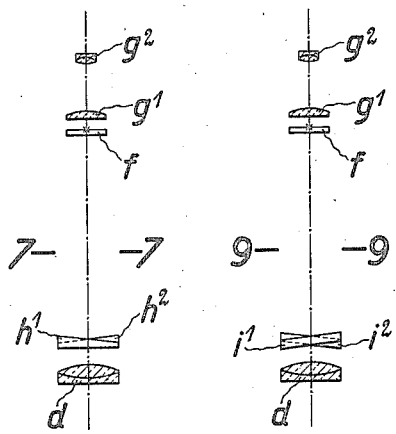
Figures 7, 9:
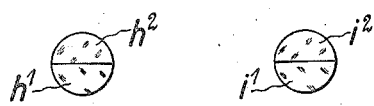

In the annexed drawing Figs. 1 and 1ᵃ show in a plan elevation a pair of bodies, each of which is provided with a knife-edge according to the invention. Fig. 2 is a view of a suitable divided plate of a microscope. Fig. 3 is an elevation partly in section of a constructional example of a microscope, Fig. 4 is a cross section on the line 4—4 of Fig. 3, Fig. 5 shows the divided plate of this microscope on an enlarged scale. Fig. 6 is a diagram illustrating the optical system of a second microscope, Fig. 7 shows the structure at the line 7—7 of Fig. 6. Fig. 8 is a diagram illustrating the optical system of a third microscope, Fig. 9 shows the structure at the line 9—9 of Fig. 8.

The bodies $a$ shown in Fig. 1 consist of glass which is coated with an opaque layer on the side, facing the microscope and turned towards the observer in the drawing. In this layer there are engraved cross-shaped marks $a^1$. Each of these bodies is provided with a knife-edge $a^2$. If it be desired to determine by means of these bodies the flank diameter of a screw, the user does not measure the distance $x$ between the two knife-edges to be laid against the thread flanks but the distance $y$ and deducts therefrom the two lengths $z$.

With the pair of bodies $a$ shown in Fig. 1ª where the knife-edges are shown in contact each body is provided with a linear mark $a^0$ parallel to the knife-edge.

Fig. 2 shows an example of a divided plate of a microscope which is suited for use together with the bodies represented in Fig. 1ª. The divided glass plate $b$ carries two parallel linear marks $b^1$, formed each by short lines at intervals, and perpendicularly thereto a linear mark $b^2$ indicating the centre of the image field. If, during the measurement of the flank diameter of a screw bolt, the divided plate is brought by means of rotation into such a position that, with the knife-edges laid on the two flanks of the screw, the marks $b^1$ are parallel to the marks $a^0$, a displacement of the microscope by exactly the amount of the flank diameter of the respective bolt is evidently required in order to be able to pass over from the coincidence of the image of the one mark $a^0$ with the one mark $b^1$ to the coincidence of the image of the other mark $a^0$ with the other mark $b^1$.

Figs. 3 to 5 show an example of a double-image microscope according to the invention. The microscope tube $c$ carries, rigidly disposed in its front end-plate, one half of an objective $d^1$. The other half of this objective $d^2$ is displaceable perpendicularly to the axis of the tube $c$ by means of a screw $e$ along the axial, plane boundary surface of this half of an objective. The divided plate $f$ is provided with a mark $f^1$, only formed by short lines, and with a linear mark $f^2$ perpendicular thereto. The ocular of the microscope is formed by the lenses $g^1$ and $g^2$. By adjusting the part $d^2$, the microscope is so adapted to a pair of bodies corresponding to Fig. 1ª, that, on the knife-edges coming in contact with one another, the two middle images of all four images of the marks of the body coincide. When measuring, the mark $f^1$ is first brought into coincidence with the image of the mark of the one body and thereupon, by displacing the whole microscope, with the image of the mark of the other body.

Figs. 6 and 7 as well as Figs. 8 and 9 show the optical systems of two other double-image microscopes according to the invention.

The system shown in Figs. 6 and 7 consists of an objective $d$, two semicircular wedge-shaped plates $h^1$ and $h^2$ which are conjointly displaceable in the direction of the optical axis of the microscope, a plate $f$ according to Fig. 5 and an ocular, composed of the two lenses $g^1$ and $g^2$.

The system shown in Figs. 8 and 9 consists of an objective $d$, two semicircular, plane-parallel plates $i^1$ and $i^2$ which, as shown in Fig. 8, are obliquely directed towards the optical axis and conjointly displaceable in the direction of this axis, a plate $f$ according to Fig. 5 and an ocular, composed of the two lenses $g^1$ and $g^2$.

In the microscope system shown in Figs. 6 and 7 the adaptation to the pair of knife-edges to be used is effected by a corresponding displacement of the plates $h^1$ and $h^2$ in the direction of the optical axis and in the system shown in Figs. 8 and 9 by a displacement of the plates $i^1$ and $i^2$ in the axial direction. During the measurement it is necessary with both systems just as with the microscope, shown in Figs. 3 and 4, to first bring the mark on the linear plate into coincidence with the image of the mark of the one body provided with a knife-edge and thereupon with the image of the mark of the other body provided with a knife-edge.

I claim:

1. For use in an apparatus for testing bolt threads a microscope adapted to produce a double image of the object observed, the microscope being provided with a device adapted to alter the relative position of the said two images and containing in the focal plane of its ocular a mark, and two bodies each of which is provided with a knife-edge, adapted to be brought in contact with a thread flank of the bolt to be tested, and with a mark, lying in the vicinity of the edge.

2. For use in an apparatus for testing bolt threads a microscope, the objective of which consists of two half-lenses, the microscope being provided with a device adapted to alter the relative position of the said two half-lenses and containing in the focal plane of its ocular a mark, and two bodies, each of which is provided with a knife-edge adapted to be brought in contact with a thread flank of the bolt to be tested, and with a mark lying in the vicinity of the edge.

3. For use in an apparatus for testing bolt threads a microscope, the objective of which consists of two half-lenses, the microscope being provided with a device adapted to alter the relative position of the said two half-lenses and containing in the focal plane of its ocular a straight-lined mark rotatable about the axis of the ocular, and two bodies, each of which is provided with a knife-edge adapted to be brought in contact with a thread flank of the bolt to be tested, and with a straight lined mark which is parallel to the edge.

OTTO EPPENSTEIN.